(12) United States Patent
Sakata et al.

(10) Patent No.: US 8,891,635 B2
(45) Date of Patent: Nov. 18, 2014

(54) TRANSMITTING APPARATUS AND RECEIVING APPARATUS

(75) Inventors: Ren Sakata, Yokohama (JP); Tsuyoshi Kogawa, Kawasaki (JP); Kaoru Inoue, Machida (JP); Koichiro Ban, Kawasaki (JP); Noritaka Deguchi, Yokohama (JP); Takahiro Kobayashi, Kawasaki (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 0 days.

(21) Appl. No.: 13/230,948

(22) Filed: Sep. 13, 2011

(65) Prior Publication Data

US 2012/0063535 A1   Mar. 15, 2012

Related U.S. Application Data

(63) Continuation of application No. PCT/JP2009/070842, filed on Dec. 14, 2009.

(30) Foreign Application Priority Data

Mar. 13, 2009   (JP) .................................. 2009-061988

(51) Int. Cl.
*H04L 27/00* (2006.01)
*H04W 28/06* (2009.01)

(52) U.S. Cl.
CPC .................................. *H04W 28/065* (2013.01)
USPC ............................................ 375/259; 375/340

(58) Field of Classification Search
CPC . H04W 28/065; H04W 28/12; H04W 72/042; H04W 72/0426; H04L 5/0053; H04L 5/001; H04L 1/1614
USPC ............................ 375/295, 340, 259; 370/208
See application file for complete search history.

(56) References Cited

U.S. PATENT DOCUMENTS 6,842,787 B2 *   1/2005   Stadler et al. .................. 709/231
6,950,387 B2 *   9/2005   Shor et al. ...................... 370/206

(Continued)

FOREIGN PATENT DOCUMENTS

| JP | 2008-54319 A | 3/2008 |
|---|---|---|
| WO | 2003/043240 A1 | 5/2003 |
| WO | 2008/083804 A2 | 7/2008 |
| WO | 2009/001594 A1 | 12/2008 |

OTHER PUBLICATIONS

Technical Specification; 3GPP TS 36.211, Ver. 8.3.0, "Physical Channels and Modulation"; May 2008; pp. 1-77.

(Continued)

*Primary Examiner* — Shuwang Liu
*Assistant Examiner* — Helene Tayong
(74) *Attorney, Agent, or Firm* — Ohlandt, Greeley, Ruggiero & Perle, L.L.P.

(57) ABSTRACT

According to one embodiment, a transmitting apparatus includes a generation unit, a division unit, an imparting unit and a transmitting unit. The generation unit generates first control information in accordance with a first information format. The division unit divides the first control information into control information pieces in accordance with information format divisions into which the first information format is divided and which include respective pointer regions, each of the information format divisions having a same data length as a second information format. The imparting unit imparts, to the pointer region of each of the information format divisions, a pointer indicating a wireless communication resource used to transmit one of the control information pieces corresponding to one of the information format divisions other than the each control information format division. The transmitting unit transmits the control information pieces.

18 Claims, 15 Drawing Sheets

(56) References Cited

U.S. PATENT DOCUMENTS

| | | | |
|---|---|---|---|
| 7,193,986 B2* | 3/2007 | Scanlon et al. | 370/338 |
| 7,952,991 B2* | 5/2011 | Kim et al. | 370/210 |
| 8,068,518 B2* | 11/2011 | Kuwabara | 370/539 |
| 2002/0145985 A1* | 10/2002 | Love et al. | 370/328 |
| 2003/0189918 A1* | 10/2003 | Das et al. | 370/349 |
| 2005/0207369 A1* | 9/2005 | Bolourchi et al. | 370/320 |
| 2007/0165514 A1* | 7/2007 | Akita | 370/208 |
| 2010/0067465 A1* | 3/2010 | Miki et al. | 370/329 |
| 2010/0120442 A1* | 5/2010 | Zhuang et al. | 455/450 |
| 2011/0280190 A1 | 11/2011 | Sakata et al. | |
| 2012/0064933 A1 | 3/2012 | Sakata et al. | |

OTHER PUBLICATIONS

Technical Specification; 3GPP TS 36.213, "Physical Layer Procedures"; May 2008; pp. 1-45.

NTT DOCOMO, Inc.; "Update Views on Support of Wider Bandwidth in LTE—Advanced"; 3GPP TSG RAN WG1 Meeting #54; R1-083015; Aug. 2008, pp. 2-18.

International Search Report and Written Opinion dated Jan. 26, 2010 for PCT/JP2009/070842.

Office Action dated May 15, 2012 from corresponding JP 2009-061988.

* cited by examiner

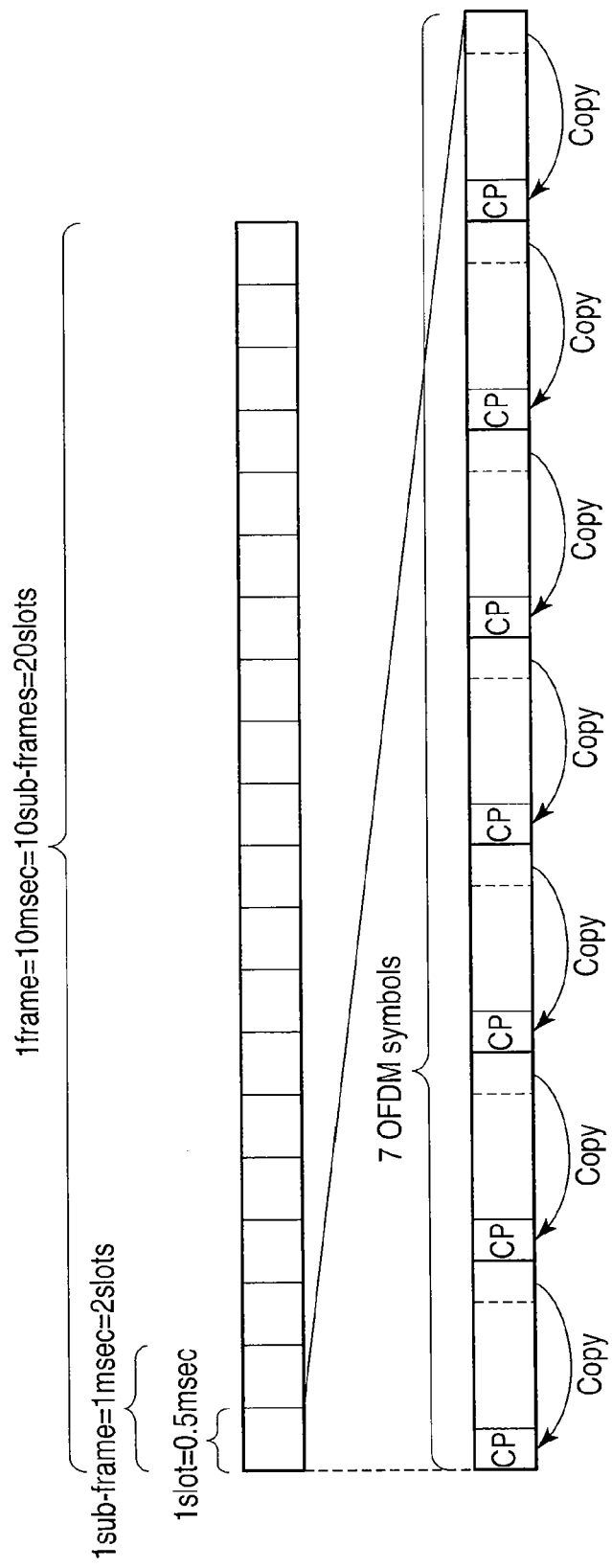
F I G. 4

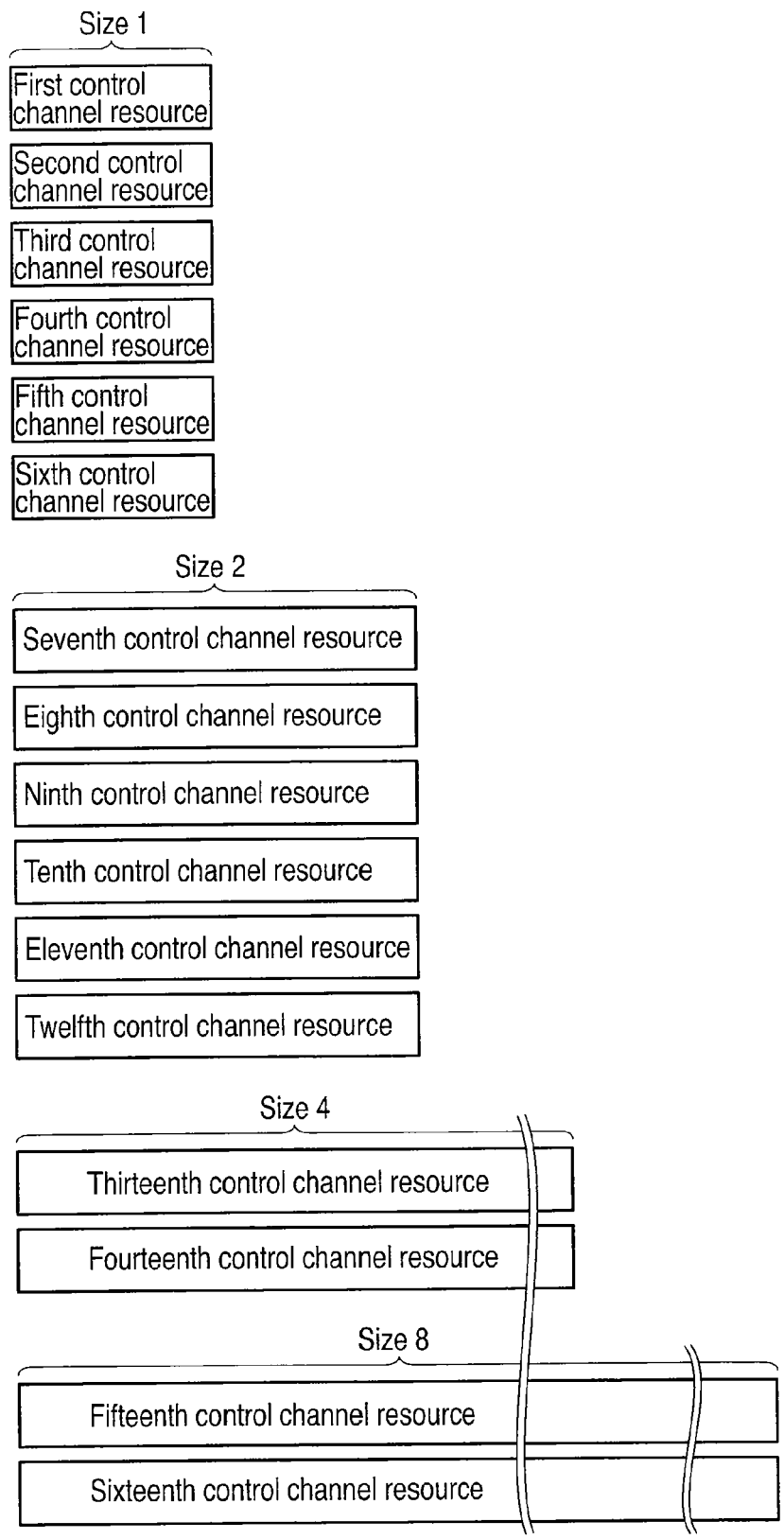
F I G. 7

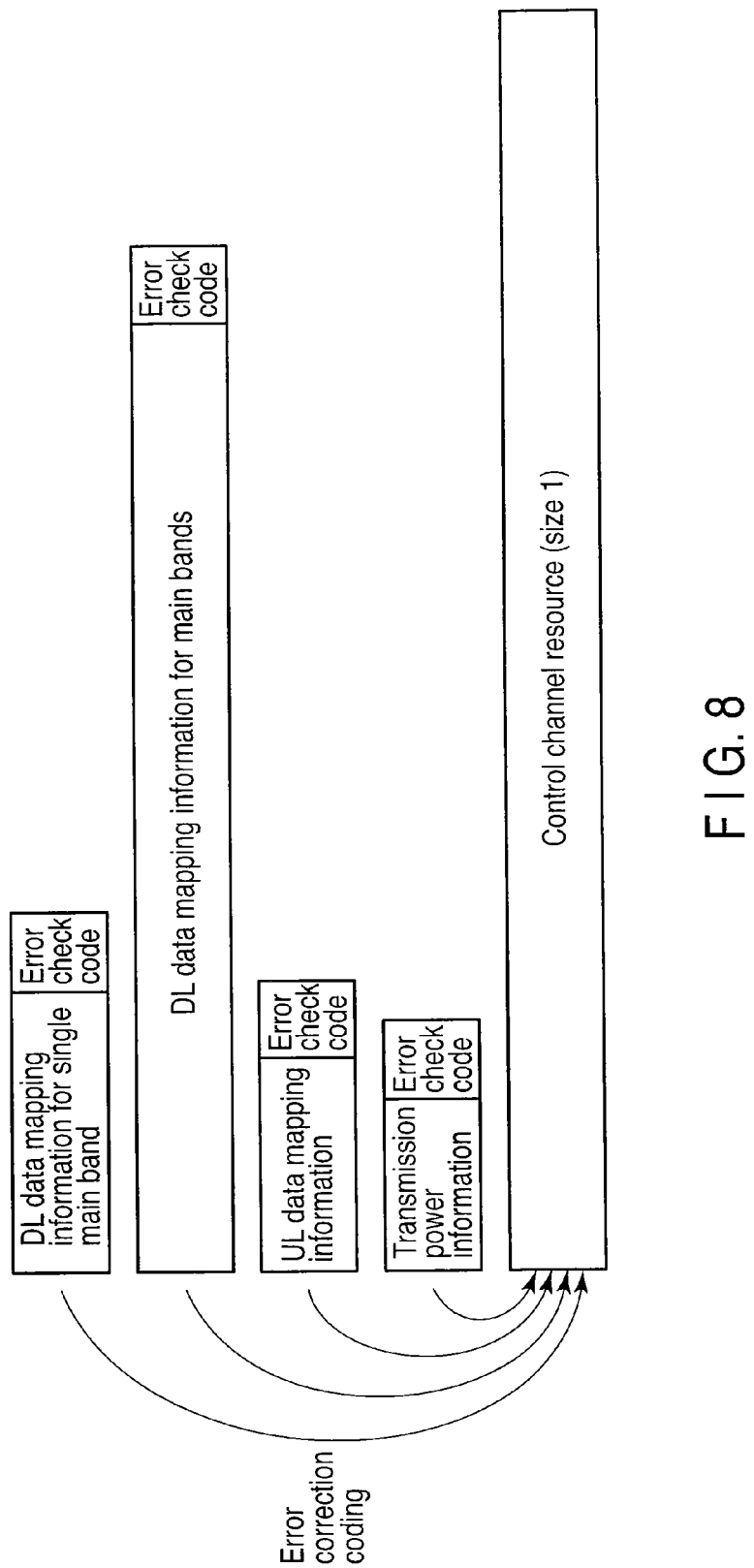
F I G. 8

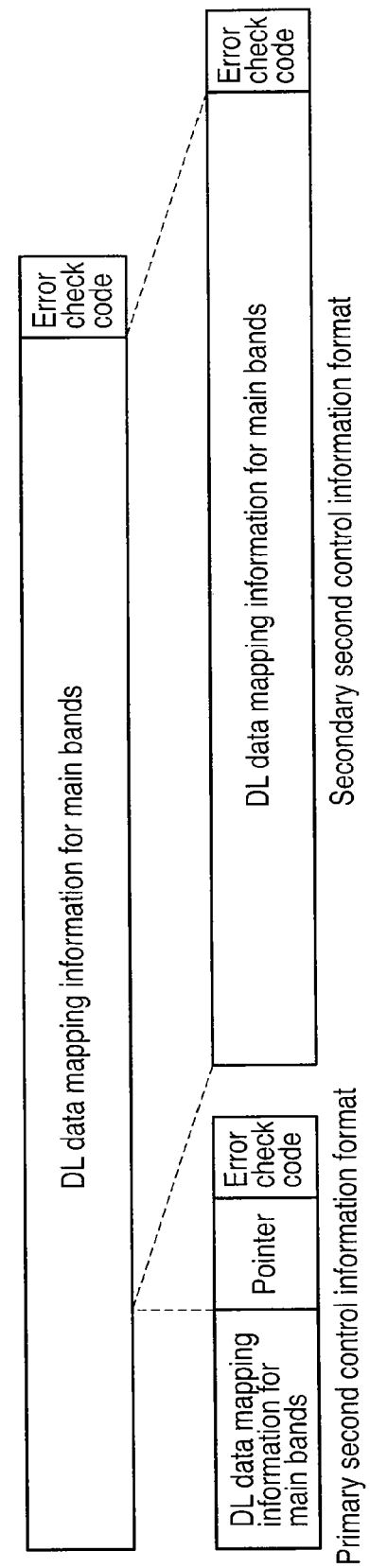
F I G. 9

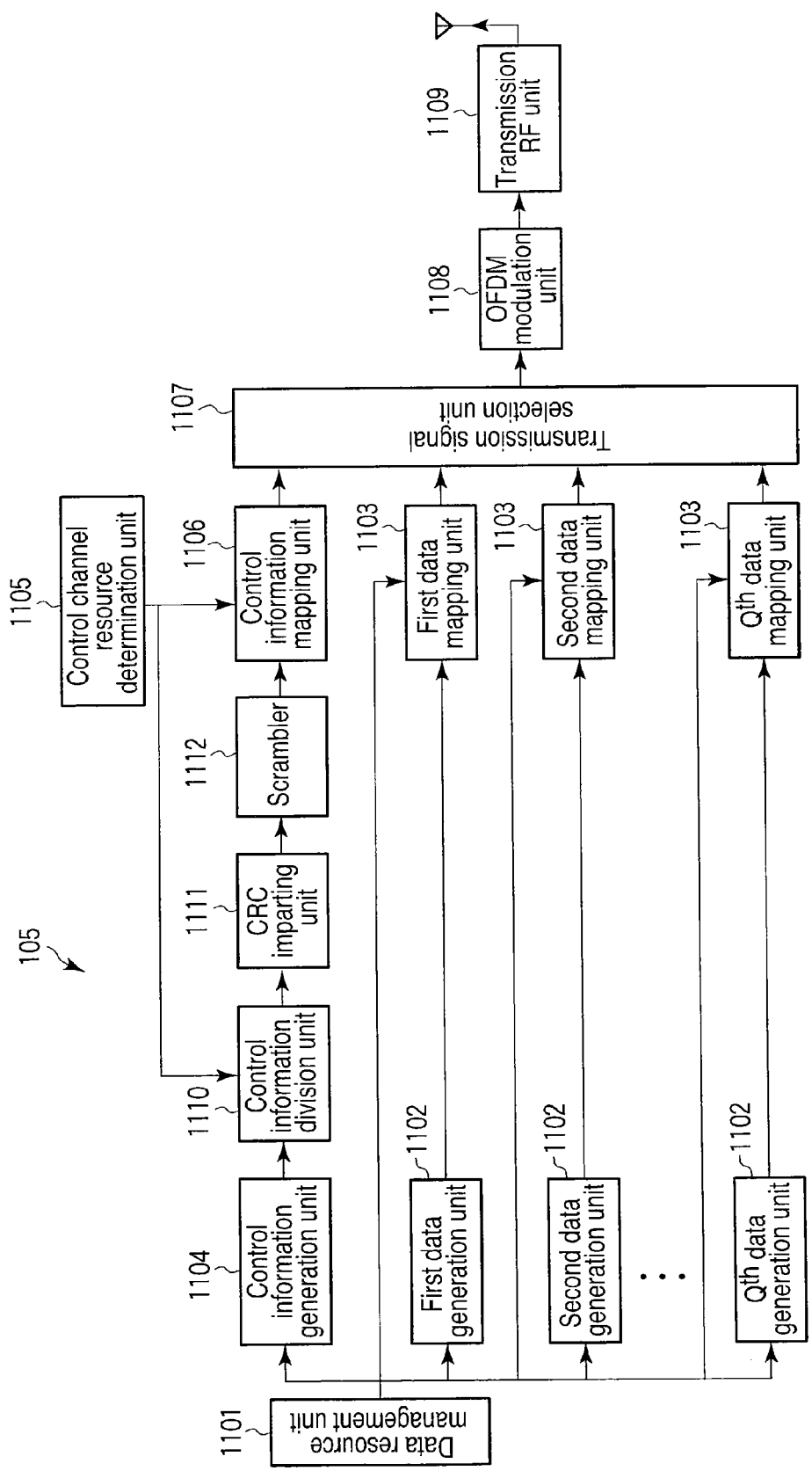
F I G. 11

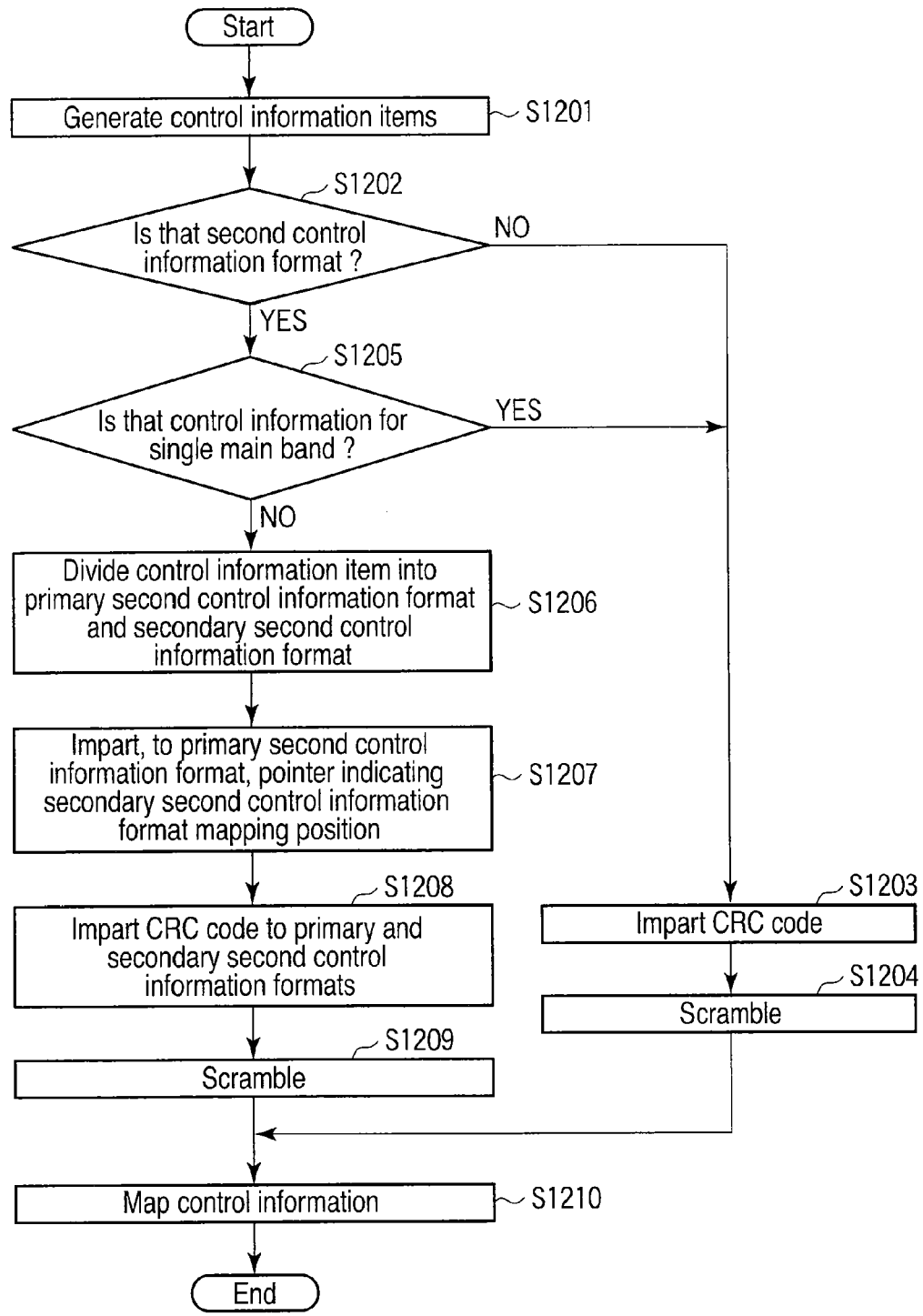
F I G. 12

TRANSMITTING APPARATUS AND RECEIVING APPARATUS

CROSS REFERENCE TO RELATED APPLICATIONS

This application is a Continuation Application of PCT Application No. PCT/JP2009/070842, filed Dec. 14, 2009 and based upon and claiming the benefit of priority from prior Japanese Patent Application No. 2009-061988, filed Mar. 13, 2009, the entire contents of all of which are incorporated herein by reference.

FIELD

Embodiments described herein relate generally to a wireless communicating system.

BACKGROUND

In a cellular communication system, which handles simultaneous communication involving many users, as well as transmitting user data it is necessary to transmit control information associated with the user data. To ensure the control information will reach the handsets of all communicating users, a large number of communication resources must be used for its transmission. However, since the control information streams are exclusively for control and do not include embedded user data, allocation of such a large number of resources to the control information is at the expense of user data and so can reduce throughput. To avoid such a reduction, there is an improved method for transmitting control information of variable size (see, for example, Document 1: 3GPP, "Evolved Universal Terrestrial Radio Access [E-UTRA]; Physical Channels and Modulation [Release 8]," TS36.211, ver. 8.3.0 [2008]).

To deal with such variable-size control information, there is a means of detecting control information addressed to the handset of a particular user in a plurality of control information transmitted to the handsets of all users when the size of control information for the handset of the particular user is unknown (see, for example, Document 2: 3GPP, "Evolved Universal Terrestrial Radio Access [E-UTRA]; Physical layer procedures [Release 8]," TS36.213, ver. 8.3.0 [2008]). The means disclosed in Document 2 involves a blind detection method which makes multiple attempts to demodulate the control information while assuming various possible sizes of item, and determining that the control information is addressed to the handset of the user if it can be correctly demodulated. However, since considerable time and processing are required to demodulate all control information, a subset of control information to undergo attempted demodulation is determined for each user.

As well as the above techniques, there is a technique of increasing throughput by using a plurality of communication bands simultaneously (see, for example, Document 3: NTT DoCoMo, "Update Views on Support of Wider Bandwidth in LTE-Advanced," 3GPP Technical Document, R1-083015 [2008]).

BRIEF DESCRIPTION OF THE DRAWINGS

FIG. 4 is a view illustrating a frame structure according to the first embodiment;

FIG. 7 is a view illustrating an example of a control channel resource structure;

FIG. 8 is a view useful in explaining error correction coding of control information;

FIG. 9 is a view illustrating an example of a second control information format according to the first embodiment;

FIG. 11 is a block diagram illustrating a transmitting apparatus according to the first embodiment;

FIG. 12 is a flowchart useful in explaining control information generation;

DETAILED DESCRIPTION

If plural communication bands are used simultaneously, the length of each control information used to indicate assignment increases with the number of bands used. Further, considerable time and processing are required for a blind detection method which makes multiple demodulation attempts while assuming various possible lengths of item.

In general, according to one embodiment, a transmitting apparatus includes a generation unit, a division unit, an imparting unit and a transmitting unit. The generation unit is configured to generate first control information in accordance with first information format defining a first data structure and a first data length. The division unit is configured to divide the first control information into a plurality of control information pieces in accordance with information format divisions into which the first information format is divided and which include respective pointer regions, each of the information format divisions having a same data length as a second information format, the second information format being different from the first information format. The imparting unit is configured to impart a pointer to the pointer region of each of the information format divisions, the pointer indicating a wireless communication resource used to transmit one of the control information pieces corresponding to one of the information format divisions other than the each control information format division. The transmitting unit configured to transmit the control information pieces corresponding to the information format divisions imparted each of the pointers.

Transmitting and receiving apparatuses according to embodiments will be described in detail with reference to the accompanying drawings. In the embodiments, like reference numbers denote like elements, and duplication of explanation will be avoided.

(First Embodiment)

Figure 1:
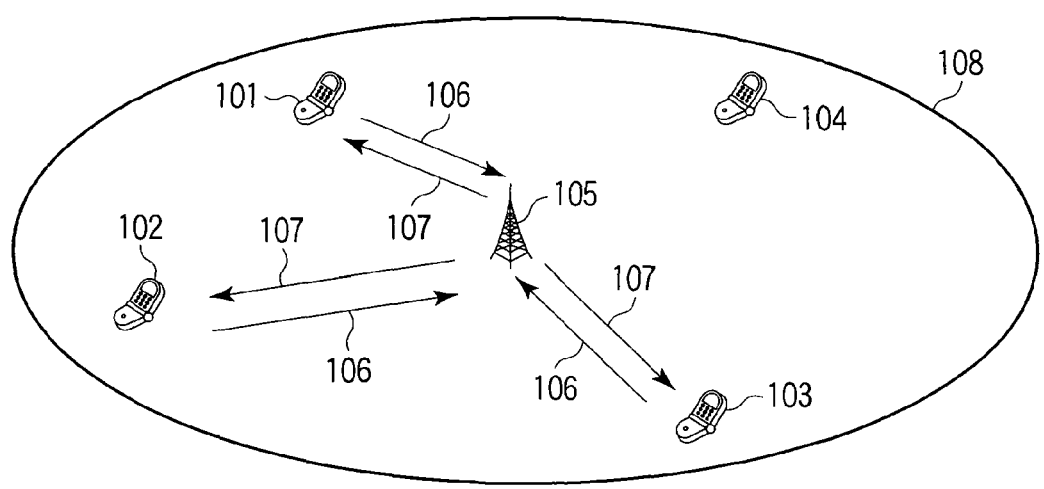
FIG. 1 is a view illustrating a communication system.
Figure 2:
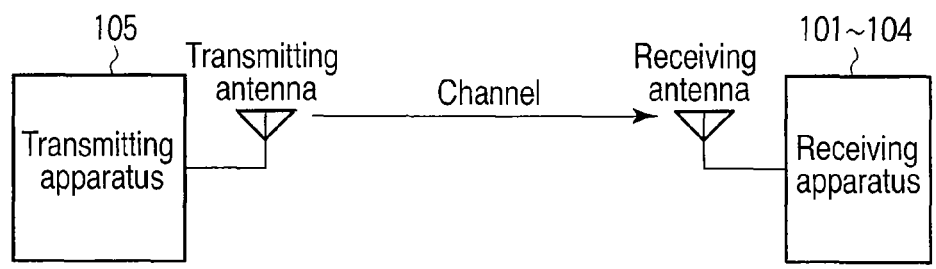
FIG. 2 is a view illustrating a downlink transmission system.

Referring to FIGS. 1 and 2, a communication system including a transmitting apparatus and a receiving apparatus according to embodiments will be described. FIG. 1 illustrates the configuration of the communication system according to the embodiments.

The communication system comprises a base station 105, and a plurality of terminals 101 to 104. The communication channel from each terminal to the base station will hereinafter be referred to as an uplink 106, and the communication channel from the base station to each terminal be referred to as a downlink 107. Assume here that the downlink utilizes orthogonal frequency division multiple access (OFDMA). In the first embodiment, the base station 105 corresponds to the transmitting apparatus, and each terminal 101-104 corresponds to the receiving apparatus. The base station 105 provides a service area 108.

FIG. 2 is a view useful in explaining the downlink. The base station 105 modulates user data and transmits an RF signal corresponding to the modulated user data via a transmission antenna. The RF signal reaches the receiving antennas of the terminals 101 to 104 via channels. The terminals 101 to 104 as receiving apparatuses process the signal received via their receiving antennas, and demodulate the signal, as a result, obtain the user data.

Figure 3:
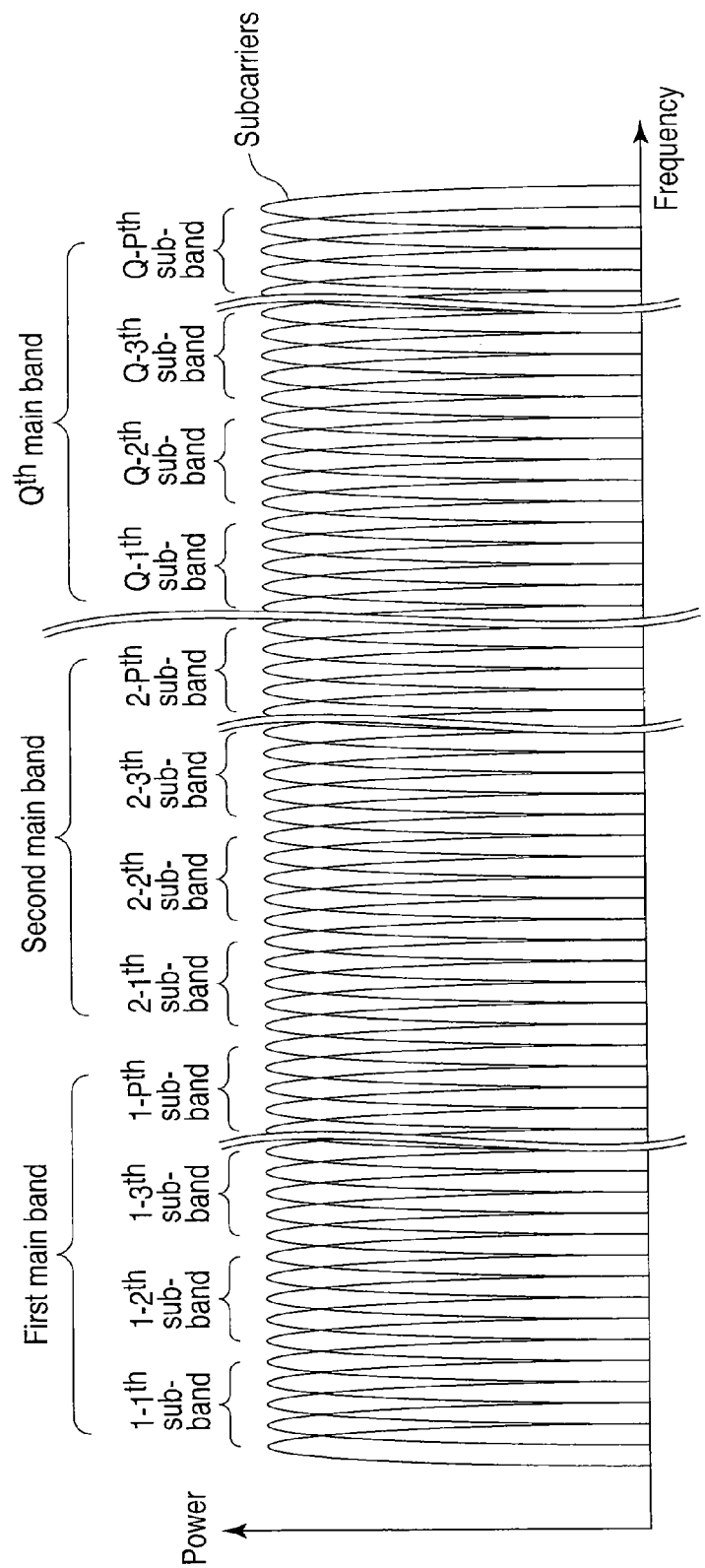
FIG. 3 is a view illustrating a subcarrier structure employed in a first embodiment.

Referring then to FIG. 3, a subcarrier structure for OFDMA communication will be described. FIG. 3 shows the subcarrier structure for the OFDMA communication according to the first embodiment. Assume here that the total number of subcarriers is N, that the N subcarriers are divided into Q main bands as transmission bands, and that each main band is divided into P sub-bands (N, Q and P: positive integers).

Referring then to FIG. 4, a frame structure in time domain will be described. FIG. 4 shows the frame structure in time domain employed in the first embodiment.

In the first embodiment, assume that one frame corresponds to 10 msec and is divided into 10 sub-frames each corresponding to 1 msec. Assume also that sub-bands assigned to transmit data are changeable in each sub-frame. Each sub-frame is divided into two slots of 0.5 msec. One slot contains seven OFDM symbols. One OFDM symbol includes a portion called a cyclic prefix in which a signal indicating the posterior half of the symbol is copied and added to the anterior half of the symbol.

Figure 5:
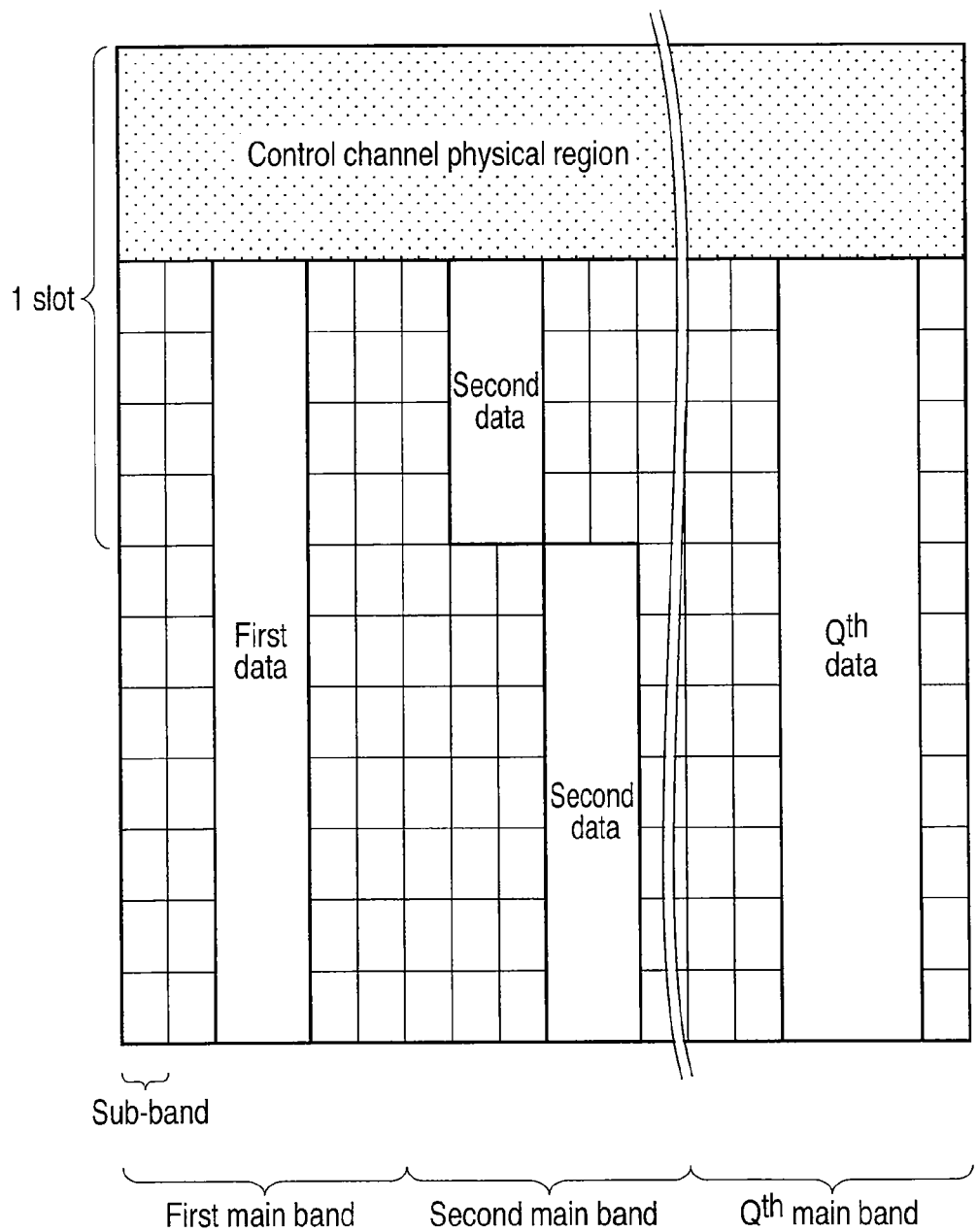
FIG. 5 is a view illustrating a data mapping in the first embodiment.

FIG. 5 two-dimensionally shows the above-described structures in frequency and time domains. In FIG. 5, the vertical axis represents time elapsing from top to bottom, and the horizontal axis represents frequency increasing from left to right. Assume that the leading three OFDM symbols of one sub-frame are set as a control channel physical region. The region ranging from the fourth OFDM symbol to the last OFDM symbol of the second slot is allocated to user data to transmit. Namely, the leading 3 OFDM symbols of a sub-frame are used to transmit a control channel, and the subsequent portion of the sub-frame is used to transmit user data. The control channel is a physical transmission signal containing control information modulated. The control information is information, which is transmitted to designate a transmitting/receiving method for a terminal, and which indicates the sub-bands allocated to data in the downlink, the sub-bands to be used to transmit data in the uplink, or the set transmission power of the uplink.

Although in the embodiment, the entire band is divided into a plurality of main bands, the control channel physical region is common to all main bands. Further, assume that when a control channel is transmitted, it can be mapped in the control channel physical region regardless of main bands. For instance, a control channel indicating data of the Qth main band may be mapped in the control channel physical region of the first main band.

It is not always necessary to use all sub-bands of a main band for user data. Namely, the user data may be transmitted using part of the sub-bands. In the case shown in, for example, FIG. 5, user data is transmitted using the third and fourth sub-bands of the first main band. The user data transmitted via the first main band will hereinafter be referred to as first data. Further, regarding user data transmitted via the second main band, the second and third sub-bands are used in the first slot, and the fourth and fifth bands are used in the second slot. Thus, different sub-bands may be used between the first and second slots. The user data transmitted via the second main band will hereinafter be referred to the second data. In a manner similar to the above, the third to Qth user data items are transmitted via the third to Qth main bands, respectively.

Figure 6:
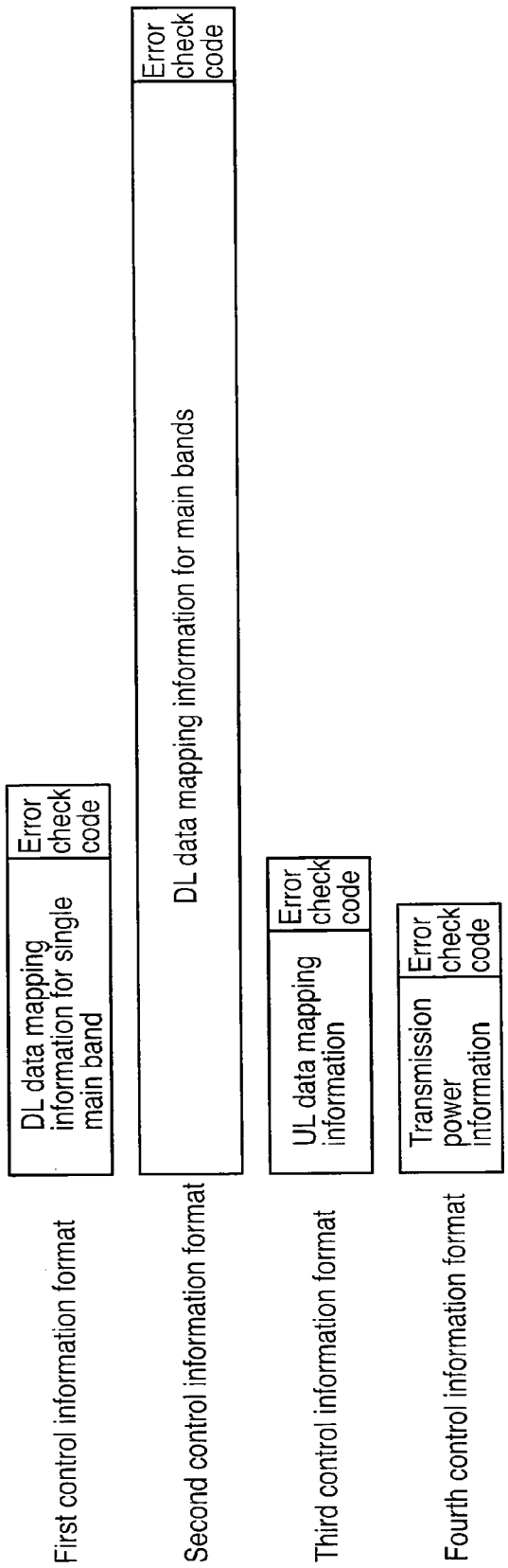
FIG. 6 is a view illustrating examples of control information formats.

Referring now to FIG. 6, a control channel included in the control channel physical region shown in FIG. 5 will be described. A plurality of control information can be transmitted by the control channel. In the first embodiment, it is assumed that four types of control information and four types of control information formats corresponding thereto are used. The four control information formats each define a data structure and a data length for the corresponding type of control information, namely, for example, the position at which an error check code, described later, is added, and the data length obtained after the addition of the error check code.

The first control information is data mapping sub-band information dedicated to the case of utilizing only a single main band in the downlink, and indicating the sub-band(s) in the main band used to transmit data. Namely, the first control information is DL data mapping information for a single main band. The control information format used to transmit the DL data mapping information for a single main band is set as a first control information format.

The second control information is DL data mapping information for a plurality of main bands, which indicates the sub-band(s) in all main bands used to transmit downlink data to user terminals. For instance, if there are five main bands in total, the data capacity of this mapping information is roughly five times that of the DL data mapping information for a single main band. Accordingly, the second control information format used to transmit the DL data mapping information for a plurality of main bands has a much greater data length than the first control information format.

The third control information is UL data mapping information indicating the uplink sub-band(s) that should be used to transmit data. The third control information format is used to transmit the UL data mapping information.

The fourth control information is transmission power information indicating whether the transmission power of the uplink should be increased or decreased, and is transmitted using the fourth control information format.

The above-mentioned four control information has different data lengths corresponding to their content. Further, respective error check codes for error detection are attached to the rear ends of the four control information. For instance, CRC codes may be used as the error check codes. This information is set for one user terminal. To transmit such information to a plurality of user terminals, a plurality of sets of control information must be transmitted using the control channel physical region.

The above-mentioned control information undergoes error correction coding as countermeasures against noise or distortion in wireless transmission. For example, through error correction coding such as convolutional coding, the control information becomes redundant to thereby increase its data length. The control information further undergo a scrambling process using a scrambling sequence, which enables only terminals sharing the scrambling sequence to acquire the control information. The resultant control information is mapped to logical control channel resources, described later, whereby they are modulated and mapped to physical control channel resources. As a result, control channels are produced.

FIG. 7 shows a logical control channel resource structure for control channels. The control channel resources represent a mechanism for facilitating designating physical resources. The physical resources represent OFDM subcarriers, to which the control channels obtained after modulation are mapped, and which are dispersed in the control channel physical region. This structure makes it troublesome for the base station to determine the physical resources to which control channels are mapped, or for the base station or each terminal to share therein the same physical resource position. To avoid these difficulties, control channel resources have been contrived which represent, in a state of bits assumed before modulation, physical resources available for mapping control channels to be transmitted to one user terminal. When the base station or the terminal indicates the position of a control channel in its own system, the logical resource corresponding to the control channel is designated, and is then converted into a physical resource when necessary. This facilitates the designation of the physical resource. The logical resource and the physical resource can be also referred to as a communication resource. Further, the base station maps, to one of the logical control channel resources, one control information produced in accordance with a control information format, then modulates the same into a control channel, and transmits the control channel using the physical control channel resource corresponding to the one logical control channel resource. Assume that FIG. 7 shows a logical control channel resource structure that includes logical channel resources dispersed to the subcarriers in the control channel physical region ranging over the entire main bands, i.e., to the physical control channel resources. Assume also that the relationship between the logical control channel resources and the physical control channel resources is beforehand determined in the system.

In the system of the embodiment, the user terminals (101 to 104) are at different distances from the base station 105. For a user terminal positioned at a short distance from the base station, it is desirable to minimize wasteful spending of resources by suppressing the redundancy of error correction coding executed for generating control channels, thereby minimizing data lengths with transmission errors prevented. In contrast, for a user terminal positioned at a long distance from the base station, it is necessary to increase the redundancy for preventing transmission errors, to thereby set relatively large data lengths for reliable transmission.

As described above, when transmitting control channels, it is desirable to vary the redundancy of error correction coding in accordance with the distance between a user terminal and the base station. To this end, it is assumed that a plurality of data lengths are set for the control channel resources. In this embodiment, four sizes are prepared, i.e., size 1 as a reference size, size 2 that is twice size 1, size 4 that is four times size 1, and size 8 that is eight times size 1. However, if a large number of control channel resources of such a great size as size 8 are secured, the control channel physical resources may run short. Therefore, assume here that there are provided six control channel resources of size 1, six control channel resources of size 2, two control channel resources of size 4, and two control channel resources of size 8. The base station maps control information in anyone of the sixteen control channel resources. At this time, in the control channel physical region, one control channel information of each type is set for one user. Further, when control channels are sent to a plurality of users, overlapping use of the same control channel resource should be avoided.

In the receiving process of a target receiving apparatus 101-104, in order to acquire control information addressed thereto, the receiving apparatus needs to detect the control information format with which the control information is transmitted from the base station 101, and also to detect the channel resource used by the base station 101 to transmit the control information. However, if the data mapping sub-band information and format information are also transmitted, further communication resources are required, which is undesirable. Assume here that the receiving apparatus 101-104 in the embodiment sequentially demodulates the control channel resources in association with each of the possible control information formats, and determines that the control channel resource, in which the error check code is correctly demodulated, is addressed thereto. Since the control information addressed to the target receiving apparatus is beforehand subjected to scrambling using a scrambling sequence assigned thereto, if the apparatus descrambles the control information, it can correctly demodulate the same. In contrast, information addressed to another terminal is scrambled using a different scrambling sequence. Accordingly, even if the target receiving apparatus descrambles this information using the scrambling sequence assigned thereto, it cannot correctly demodulate the information. The above-mentioned detection method will be hereinafter referred to as blind detection of control information. If control information may have been transmitted using all of the four control information formats, four demodulation attempts, at the maximum, must be made for each control channel resource while varying the coding rate. Moreover, since there are sixteen control channel resources in total, error correction decoding must be attempted 64 times (4×16) at the maximum if all possibilities are covered in blind detection.

FIG. 8 shows in detail an example of the control channel resource of size 1. As described above, there are control information formats of four data lengths. If control information of the four control information formats is mapped to a control channel resource of size 1, four coding rates are used for the four control information formats. Accordingly, the receiving terminal must attempt to demodulate the control channel resource of size 1 using four error correction coding rates. Since similar demodulation attempts must be made on the sixteen control channel resources using the four error correction coding rates, 64 attempts, at the maximum, must be made.

Figure 10:
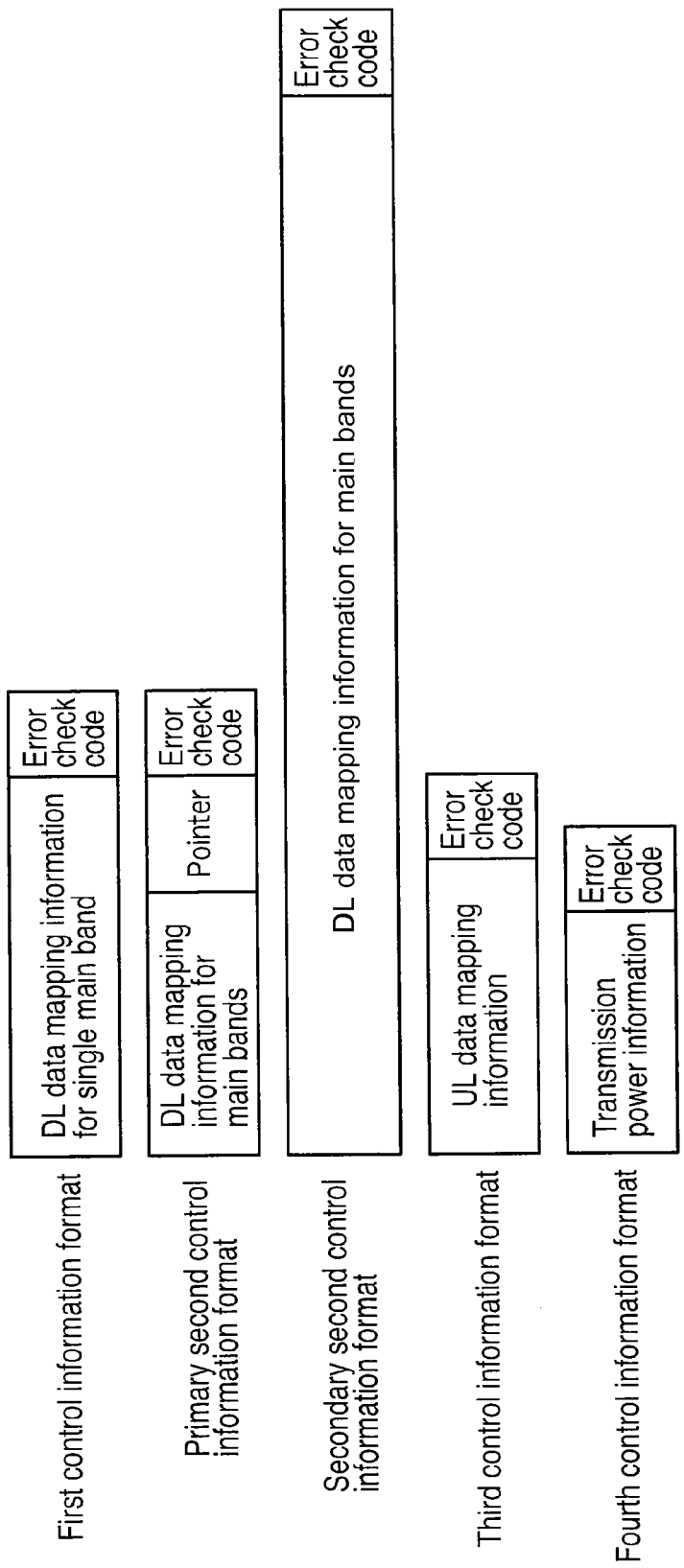
FIG. 10 is a view illustrating a list of control information formats according to the first embodiment.

Execution of as many demodulation attempts as the above is inefficient. To avoid this, each control information format is divided into format divisions in accordance with the data length of, for example, the smallest control information format. A plurality of control information generated in accordance with the control information format divisions are mapped to respective control channel resources. Each of the control information format divisions includes a pointer that indicates the position of the control channel resource to which another control information is mapped. This enables the control information formats to be unified in size, and hence enables the coding rates (used to map control information to the control channel resources) to be unified, thereby significantly reducing the number of the required error correction decoding attempts. Referring now to FIGS. 9 and 10, a detailed description will be given of an example where only the second control information format is divided into two divisions.

FIG. 9 shows the two second control information format divisions. One of the information format divisions is defined as a primary second control information format, and the other division is defined as a secondary second control information format.

The primary second control information format comprises control information, i.e., a bit sequence corresponding to a piece of downlink data mapping information for a plurality of main bands obtained after the division, and also comprises a pointer and an error check code. The pointer is mapping information indicating the control channel resource that includes the control information of the secondary second control information format, namely, indicating one of the sixteen control channel resources. The pointer is 4-bit information. The error check code is set identical to that used in any other control information format. Further, the primary second control information format includes those three data items, and has the same data length as the first control information format. Namely, format division is performed to cause the primary second control information format to include the aforementioned piece of downlink data mapping information for a plurality of main bands, the pointer and the error check code, and to have the same data length as the first control information format.

The secondary second control information format is a format for transmitting the error check code and the downlink data mapping information for main bands that could not be contained in the primary second control information format.

FIG. 10 shows the control information formats resulting from the above-mentioned division of the second control information format. As described above, the first control information format has the same data length as the primary second control information format. It should be noted here that the primary second control information format includes the pointer indicating the control channel resource to which the control information of the secondary second control information format is mapped. Namely, if the pointer included in the primary second control information format is acquired, the control channel resource, to which the control information of the secondary second control information format is mapped, can be detected. Furthermore, a coding rate also can be detected on the basis of the data length of secondary second control information format and the data length of control channel resource to which the secondary second control information format is mapped.

Accordingly, the data transmitted using the secondary second control information format can be modulated without blind detection executed on a plurality of control channel resources using a plurality of coding rates. If the secondary second control information format falls outside blind detection candidates, it is sufficient if only the control information formats of three data lengths undergo blind detection. In this case, since the first control information format and the primary second control information format can be processed using a single error correction coding rate, the number of error correction coding rates used to map these formats to a single control channel resource is limited to three. As a result, the number of error correction decoding attempts required for the blind detection of the sixteen control channel resources can be reduced to 48 (=3×16).

Referring then to FIG. 11, the transmitting apparatus 105 of the embodiment will be described in detail.

The transmitting apparatus 105 of the embodiment comprises a data resource management unit 1101, a first data generation unit 1102, a first data mapping unit 1103, a Qth data generation unit 1102, a Qth data mapping unit 1103, a second data generation unit 1102, a second data mapping unit 1103, a control information generation unit 1104, a control channel resource determination unit 1105, a control channel mapping unit 1106, a transmission signal selection unit 1107, an OFDM modulation unit 1108, a transmission RF unit 1109, a control information division unit 1110, a CRC imparting unit 1111, and a scrambler 1112. Here, Q is a natural number greater than 3, and indicates that there are Q data generation units and Q data mapping units. If, for instance, Q is 5, there exist first to fifth data generation units and first to fifth data mapping units.

When user data to be transmitted occurs, the data resource management unit 1101 sets sub-bands in the respective main bands, in which the user data is mapped. More specifically, it determines the user data to be transmitted via each main band, and the number of the sub-bands needed in each main band, and generates data mapping sub-band information as sub-band allocation information used for determining sub-band allocation in each main band. The data resource management unit 1101 sends the data mapping sub-band information to the first to Qth data generation units 1102, to the first to Qth data mapping units 1103, and to the control information generation unit 1104.

The first data generation unit 1102 receives the data mapping sub-band information from the data resource management unit 1101, generates first data to be transmitted via the first main band based on the data mapping sub-band information. More specifically, the first data generation unit 1102 extracts and modulates the part of the user data to be transmitted via the first main band. As the modulation scheme, QPSK, 16QAM, 64QAM modulation schemes, for example, can be used. It is a matter of course that the modulated first data must have a data length which permits the data to be contained in the corresponding sub-band(s) reported by the data resource management unit 1101. The thus-generated first data is sent to the first data mapping unit 1103.

The first data mapping unit 1103 maps, in the corresponding sub-band(s), the first data sent from the first data generation unit 1102. Actually, the mapping unit maps the modulated first data in the subcarrier(s) corresponding to the sub-band(s). The portion(s) of mapping is indicated by the data resource management unit 1101. The signal generated by the first data mapping unit 1103 is sent to the transmission signal selecting unit 1107.

The second to Qth data generation units 1102 operate in the same way as the first data generating unit 1102, except that their generation targets are second to Qth data. Therefore, no description will be given thereof. Similarly, the second to Qth data mapping units 1103 operate in the same way as the first data mapping unit 1103, except that their mapping targets are second to Qth main bands, and therefore no description will be given thereof.

The control information generation unit 1104 receives data mapping sub-band information for each main band from the data resource management unit 1101, and generates control information based on the data mapping sub-band information. Further, if the base station causes a terminal to transmit uplink data, the control information generation unit 1104 generates control information indicating the sub-band(s) used to transmit the data. Yet further, if the base station controls the transmission power of a terminal, the control information generation unit 1104 generates control information as transmission power control information. The control information generated by the control information generation unit 1104 is sent to the control information division unit 1110.

The first control channel resource determination unit 1105 determines which one of the sixteen control channel resources included in the control channel logical region should be used to transmit a control channel to a certain terminal. At this time, considering that the control channel region is also used to transmit a control channel to another terminal, the determination unit 1105 selects a control channel resource that differs from the control channel resource used to transmit the channel to the another terminal. Information indicating the selected control channel resource is sent to the control information division unit 1110 and the control information mapping unit 1106.

If the control information received from the control information generation unit 1104 includes control information as data mapping sub-band information directed to all downlink main bands, the control information division unit 1110 divides the control information into two pieces so that one of the two pieces has the same data length as one of the data lengths defined in the other control information formats when a pointer and a CRC code are imparted, as will now be described. Namely, the control information division unit 1110 imparts, to the one piece of the control information, 4-bit information serving as the pointer and associated with the mapping of the remaining information acquired from the control channel resource determination unit 1105. The thus-divided control information is sent to the CRC imparting unit 1111. In contrast, if the control information received from the control information generating unit 1104 is not the data mapping sub-band information directed to all downlink main bands, it is directly sent to the CRC imparting unit 1111.

The CRC imparting unit 1111 imparts an error check code to the control information received from the control information division unit 1110. In this embodiment, a CRC code is used as the error check code. The control information provided with the CRC code is sent to the scrambler 1112.

The scrambler 1112 multiplies the control information with the CRC code, received from the CRC imparting unit 1111, by a scrambling sequence unique to the user terminal. Assume here that for control information of the same data length but of different control information formats, different scrambling sequences are used as those unique to the user terminal.

The control channel mapping unit 1106 maps the control information, received from the scrambler 1112, to the physical control channel resource determined from the logical control channel resource that is determined by the control channel resource determination unit 1105. More specifically, the control channel mapping unit 1106 modulates the control information, and maps the modulation symbols of the modulated control information to subcarriers in the 3 OFDM symbols that form the control channel physical region. The resultant control information is sent to the transmission signal selection unit 1107.

Depending upon the point of time, the transmission signal selection unit 1107 selectively transmits, to the OFDM modulation unit 1108, the control information received from the control channel mapping unit 1106, and the user data received from the first to Qth data mapping units 1103.

The OFDM modulation unit 1108 modulates the signal output from the transmission signal selection unit 1107, then imparts a cyclic prefix to the modulated signal and sends the resultant signal to the transmission RF unit 1109.

The transmission RF unit 1109 converts, into an analog signal of an RF frequency, the OFDM-modulated baseband signal received from the OFDM modulation unit 1108, and sends the same to a transmission antenna. The transmission RF signal thus-output from the transmission RF unit 1109 is externally transmitted via the transmission antenna.

Referring then to the flowchart of FIG. 12, a detailed description will be given of an operation of the transmitting apparatus 105 of the first embodiment for generating a control channel.

Firstly, the control information generation unit 1104 generates control information based on the data mapping sub-band information received from the data resource management unit 1101 (S1201).

Subsequently, the control information division unit 1110 detects whether the generated control information is of a second control information format (S1202). If the answer at this step is No, i.e., if the format of the control information is not the second control information format, the process proceeds to step S1203. In contrast, if the answer is Yes, i.e., if the format of the control information is the second control information format, the process proceeds to step S1205.

If it is determined that the format of the control information is not the second control information format, the CRC imparting unit 1111 imparts a CRC code (S1203). After that, the scrambler 1112 scrambles the control information (S1204).

If the answer at step S1202 is Yes, it is determined whether the control information indicates downlink allocation in a single main band (S1205). If the answer at step S1205 is Yes, i.e., if the control information indicates downlink allocation in the single main band, the program proceeds to step S1203, where a CRC code is imparted as mentioned above, and then the same processing as the above is performed.

If the answer at step S1205 is No, i.e., if the control information is of a format for a plurality of main bands, the control information division unit 1110 divides the control information into pieces in accordance with the primary second control information format and the secondary second control information format (S1206). Subsequently, a pointer indicating the control information mapping range that corresponds to the secondary second control information format is imparted to the piece of the control information corresponding to the primary second control information format (S1207). After that, the CRC imparting unit 1111 imparts a CRC code to both pieces of the control information corresponding to the primary and secondary second control information formats (S1208), and the scrambler 1112 executes scrambling of the resultant information (S1209).

Lastly, the control information mapping unit 1106 modulates the control information of the control information format other than the second control information format, which is acquired at step S1204, and the divided control information of the primary and secondary second control information formats, which are acquired at step S1209, and then maps the modulated control information to subcarriers (S1210). This is the termination of the control channel generation by the transmitting apparatus.

Figure 13:
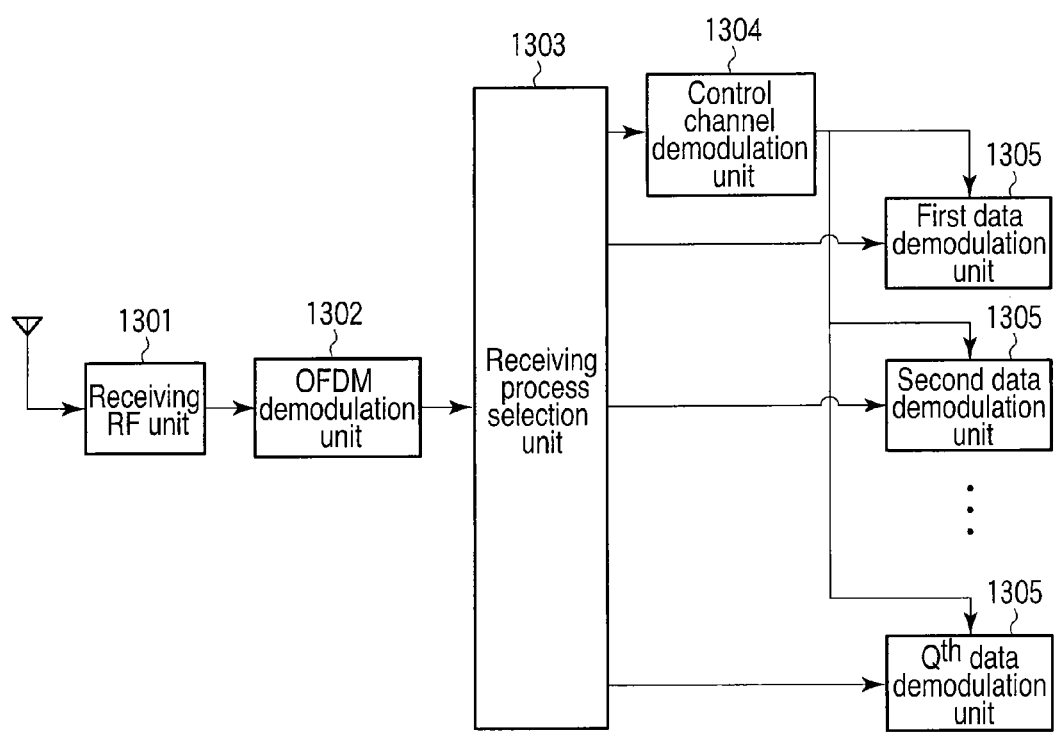
FIG. 13 is a block diagram illustrating a receiving apparatus according to the first embodiment.

Referring to FIG. 13, the receiving apparatus of the first embodiment will be described in detail.

The receiving apparatus comprises a receiving RF unit 1301, an OFDM demodulation unit 1302, a receiving process selection unit 1303, a control channel demodulation unit 1304, and first to Qth data demodulation units 1305. Q is a natural number greater than 3, and indicates that there are Q data demodulation units. If, for instance, Q is 5, there exist first to fifth data demodulation units.

The receiving RF unit 1301 receives an RF signal via the receiving antenna, and converts the signal into a digital baseband signal. The OFDM demodulation unit 1302 demodulates the digital baseband signal to extract receiving symbols from the subcarriers of the signal. Based on time information, the receiving process selection unit 1303 determines whether the receiving symbols of the subcarriers should be sent to the control channel demodulation unit 1304 or to the first to Qth data demodulation units 1305. Since the leading three OFDM symbols of each sub-frame represent control information, they are sent to the control channel demodulation unit 1304. Further, the signal components subsequent to the leading three OFDM symbols are sent to the first to Qth data demodulation units 1305.

Each data demodulation unit 1305 converts the received symbols as a physical channel resource into a logical channel resource, and then executes blind detection in the control channel logical region, i.e., sequentially demodulates the sixteen logical control channel resources using each of the three error correction coding rates to thereby detect logical control channel resources in which their error check codes are correctly decoded. The error check codes are determined to have been correctly decoded by descrambling the demodulation result using a scrambling sequence assigned thereto, and determining in a CRC checking process that the descrambling result contains no error.

As in the transmitter-side scrambling process, different scrambling sequences are used between the first control information format and the primary second control information format. When the control information format is the first control information format, if descrambling is performed using the scrambling sequence for the primary second control information format, an error is detected in the subsequent CRC checking process. Thus, by performing both the descrambling process and the CRC checking process, the first control information format and the primary second control information format can be discriminated from each other. If the same scrambling sequence is used for both the control information formats, it cannot be determined, simply by the error correction decoding process and the CRC checking process, whether the control information is the first control information format or the primary second control information format. This is because both control information formats have the same data length. In the above processes, descrambling must be performed four times at the maximum although the three error correction coding rates are used. In general, however, the error correction decoding process is much more complex than the descrambling process. Therefore, when one additional descrambling process is performed, and one less error correction decoding process is performed, a significant reduction in the amount of calculations and the shortening of the blind detection processing time can be expected. If control information that can be decoded correctly is found, it is considered to be addressed to the receiving apparatus in question. At this time, the sub-band information included in the control information is sent to each data demodulation unit.

The first data demodulation unit 1305 recognizes that the sub-band(s) designated by the control channel demodulation unit 1304 carries first data, and demodulates the first data.

The second to Qth data demodulation units 1305 operate in the same way as the first data demodulation unit 1305, except that their demodulation targets are the second to Qth main bands. Although in the first embodiment, demodulation is performed for each of the first to Qth main bands, if the receiving apparatus is configured to receive all main bands at a time, demodulation may be performed at a time for the entire main bands.

Figure 14:
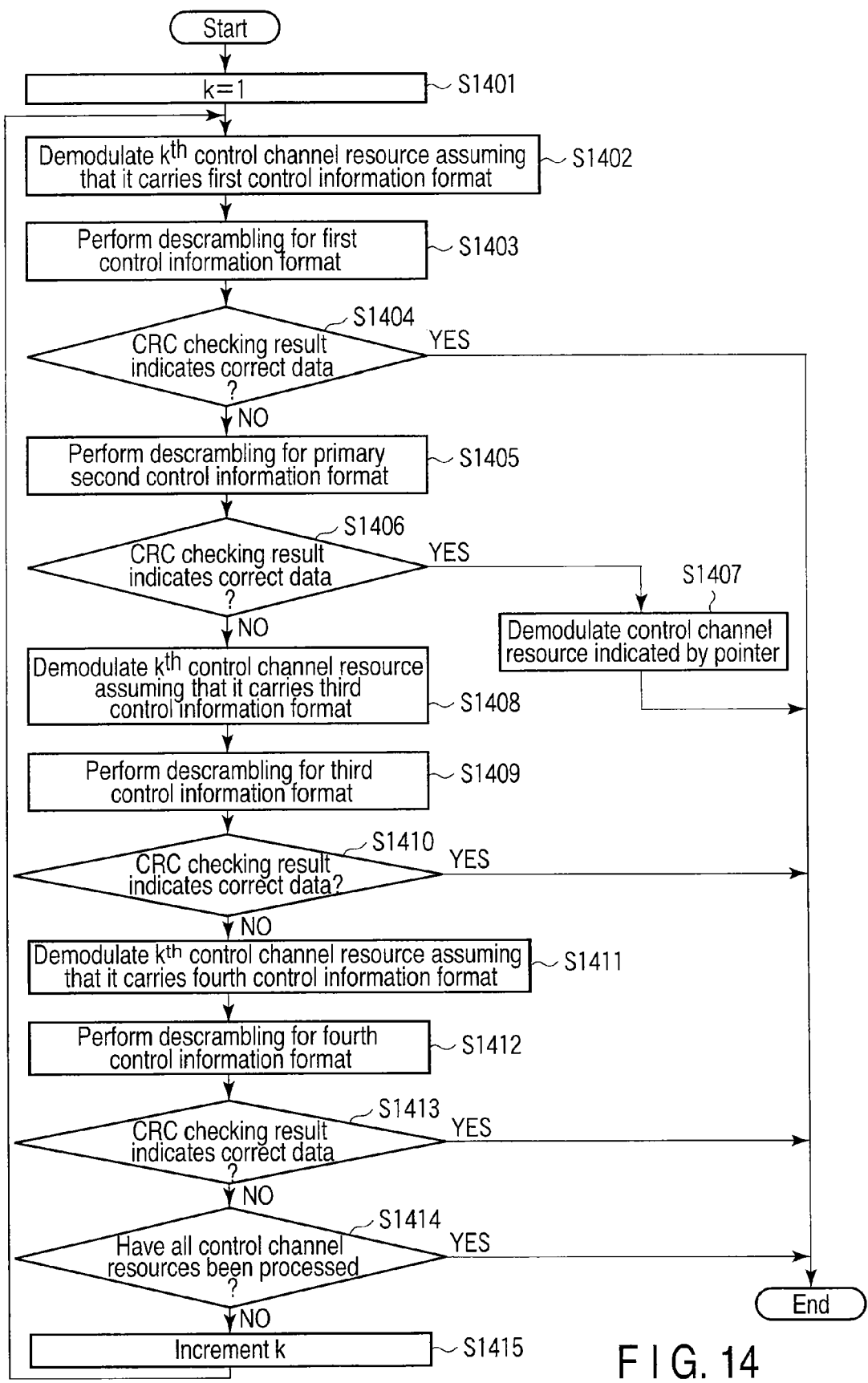
FIG. 14 is a flowchart useful in explaining blind detection performed in the receiving apparatus.

The operation of the receiving apparatus shown in FIG. 13 will be described in detail with reference to the flowchart of FIG. 14.

Firstly, the receiving apparatus sets, to 1, k that indicates a control channel resource (S1401).

Subsequently, the receiving apparatus performs demodulation, assuming that control information of the first control information format is mapped to the kth control channel resource (S1402), and performs descrambling using a scrambling sequence for the first control information format (S1403).

After that, CRC checking is performed on the data acquired at step S1403 (S1404). If it is determined that the data is correct (i.e., the answer at step S1404 is YES), this means that control information of the first control information format is carried by the kth control channel resource, followed by the termination of this process. In contrast, if the answer at step S1404 is NO, descrambling is performed using a scrambling sequence for the primary second control information format (S1405).

At the next step S1406, CRC checking is performed as at step S1404. If it is determined that the data is correct (i.e., the answer at step S1406 is YES), this means that control information of the primary second control information format is carried by the kth control channel resource, and the control channel resource indicated by the acquired pointer is considered to correspond to the secondary second control information format, and is demodulated (S1407). In contrast, if the answer at step S1406 is NO, the receiving apparatus performs demodulation, assuming that control information of the third control information format is mapped to the kth control channel resource (S1408), and performs descrambling using a scrambling sequence for the third control information format (S1409). The scrambling sequence for the third control information format may be the same as that for the first or second control information format.

At step S1410, the above-mentioned CRC checking is performed. If it is determined that the data is correct (i.e., the answer at step S1410 is YES), this means that control information of the third control information format is carried by the kth control channel resource, followed by the termination of the process. In contrast, if the answer at step S1410 is NO, the kth control channel resource is demodulated, assuming that it carries control information of the fourth control information format (S1411), and is descrambled using a scrambling sequence for the fourth control information format (S1412). The scrambling sequence for the fourth control information format may be the same as that for the first, second or third control information format.

At the next step S1413, the above-mentioned CRC checking is performed. If it is determined that the data is correct (i.e., the answer at step S1413 is YES), this means that control information of the fourth control information format is carried by the kth control channel resource, followed by the termination of the process. In contrast, if the answer at step S1413 is NO, it is determined that no control information is carried by the kth control channel resource.

At the last step S1414, it is determined whether all sixteen control channel resources have been checked. If all sixteen control channel resources are determined to have been checked, the process finishes. If it is not determined that all sixteen control channel resources have been checked, k is incremented, and the process returns to the demodulation performed assuming the first control information format (S1415). Until all control channel resources are processed, k is incremented, and when all control channel resources have been processed, demodulation by the receiving apparatus finishes.

In the above-described first embodiment, the control information is divided by dividing its control information format, and the range of variation in data length is reduced by setting control information formats to the same data length, thereby enabling the same coding rate to be used. As a result, the load of blind detection can be reduced.

(Second Embodiment)

A second embodiment differs from the first embodiment in that in the latter, the second control information format is divided into two divisions, while in the former, it is divided into more than two divisions. In the other points, the transmitting and receiving apparatuses of the second embodiment operate in the same ways as those of the first embodiment, and hence no detailed description will be given thereof.

Figure 15:
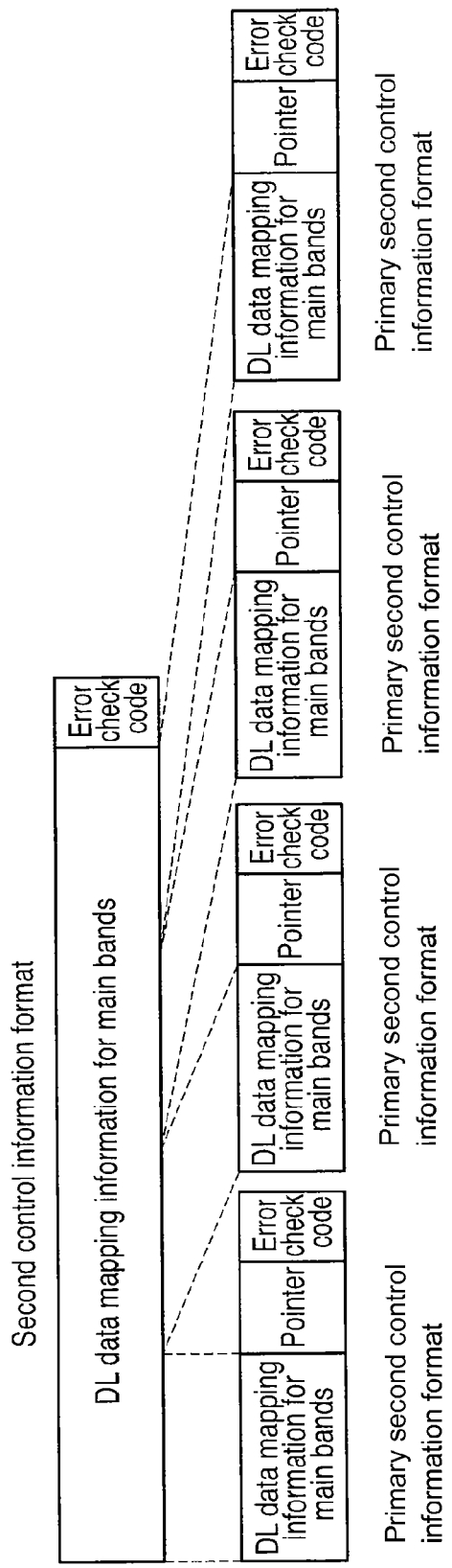
FIG. 15 is a view illustrating an example of a second control information format according to a second embodiment.

Referring to FIG. 15, a description will be given of a method, employed in the second embodiment, of dividing the second control information format. In the second embodiment, the second control information format is divided into a plurality of second control information format divisions having the same size as the first control information format.

Each second control information format division comprises downlink (DL) data mapping information for divided main bands, a pointer and an error check code. The pointer indicates the control channel resource to which the control information corresponding to one of the adjacent second control information format divisions is mapped. Although in this embodiment, the pointer is set to indicate the control channel resource to which the subsequent control information is mapped, it may be set to indicate the control channel resource to which the preceding control information is mapped. Namely, it is sufficient if all second control information format divisions are sequentially selected so that the same format division is not selected twice or more, and respective pointers that indicate control channel resources to which different control information is mapped are imparted to the format divisions. Since there are sixteen control channel resources in total, each pointer is 4-bit data. Further, the pointer in the last second control information format division is assumed to indicate the control channel resource to which the control information corresponding to the leading second control information format division is mapped. By virtue of this structure, all data items can be sequentially demodulated regardless of which control information corresponding to one of the second control information format divisions is firstly demodulated. Each second control information format division, which includes the above-mentioned information, is assumed to have the same data length as the first control information format. If a second control information format division is shorter than the first control information format, its length is adjusted by, for example, performing zero-padding.

Figure 16:
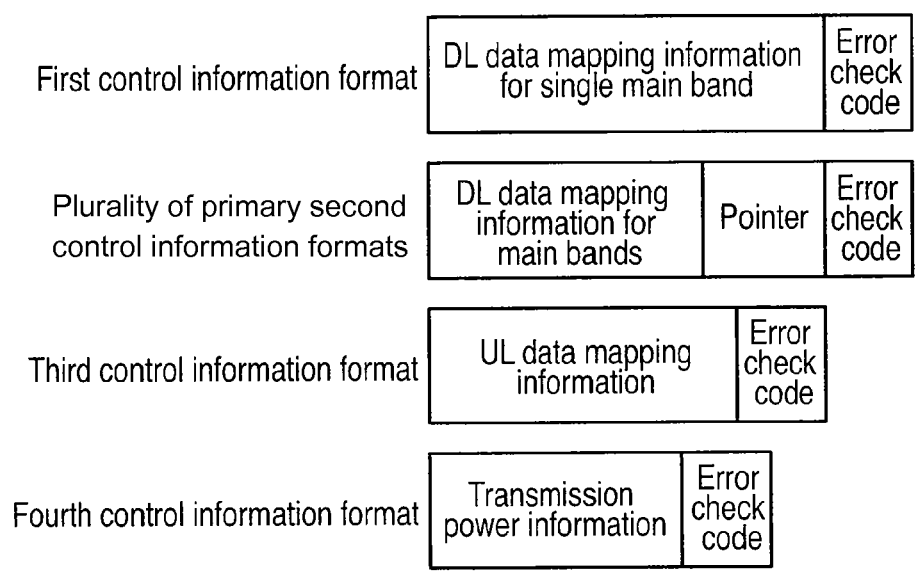
FIG. 16 is a view illustrating a list of control information formats according to the second embodiment.

FIG. 16 shows a list of control information formats according to the second embodiment. Each control channel comprises the first to fourth control information formats, and the first control information format and the second control information format divisions have the same data length. Accordingly, three error correction coding rates are imparted to each of the control channel resources having sizes 1, 2, 4 and 8. Because of this, the maximum demodulation attempts required for blind detection is 48 (=3×16). This is equal to that in the first embodiment, and is less than 64 in the case where the second control information format is not divided.

In the above-described second embodiment, the control information corresponding to the second control information format divisions are dispersed in the control channel resources, and can be demodulated with the same coding rate as the control information corresponding to the first control information format, which significantly reduces the required time and processing. Moreover, when the control information corresponding to a certain second control information format division is detected, the remaining control information can be detected simply by following the pointer in the certain second control information format division, namely, without blind detection. Furthermore, since the control information is divided into divisions of small lengths, which are dispersed in the control channel resources, the probability of detection of the control information by a small number of demodulation attempts is enhanced. As a result, it can be expected that the average number of demodulation attempts required for blind detection is reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A transmitting apparatus comprising:
a generation unit configured to generate a first control information in accordance with a first information format and second control information, the first control information and the second control information having different data lengths;
a division unit configured to divide the second control information into a plurality of control information pieces and impart a pointer to a pointer region of at least one of the plurality of control information pieces in accordance with a primary information format, and the primary information format having a same data length as the first information format, the pointer indicating a wireless communication resource used to transmit the plurality of control information pieces other than the control information piece to which the pointer was added; and
a transmitting unit configured to transmit the control information pieces corresponding to the first and primary information formats.

2. The transmitting apparatus according to claim 1, further comprising a scrambler configured to multiply the control information pieces by different scrambling sequences.

3. The transmitting apparatus according to claim 1, wherein the division unit applies a first procedure to the pointer region of the primary information format, the first procedure being used for imparting, to the pointer region of the primary information format, the pointer indicating the wireless communication resource used to transmit the control information pieces corresponding to information formats other than the primary information format, and applies the first procedure to the pointer region of each of the information formats other than a last one of the information formats such that information formats with a same pointer are not selected, and applies a second procedure to the pointer region of the last one of the information formats, the second procedure imparting the pointer that indicates the wireless communication resource used to transmit another of the control information pieces corresponding to the primary information format.

4. The transmitting apparatus according to claim 1, wherein first control information is information indicating downlink data mapping information for a single main band and the second control information is information indicating downlink data mapping information for a plurality of main bands.

5. The transmitting apparatus according to claim 1, wherein the second control information is information indicating downlink data mapping information for a plurality of main bands; the first control information is information indicating downlink data mapping information for a single main band; and the division unit acquires the plurality of control information pieces by dividing the second control information into divisions in accordance with the data length of the first information format.

6. The transmitting apparatus according to claim 1, wherein the generation unit is configured to generate all of the plurality of control information pieces in accordance with the primary information format.

7. The transmitting apparatus according to claim 1, wherein the generation unit generates the second control information in remaining information pieces from the plurality of information pieces in accordance with the secondary information format and the transmitting unit transmits the second control information.

8. A transmitting apparatus comprising:
a control information generation unit configured to generate first control information to a first control information format and second control information of different data lengths;
a division unit configured to divide the second control information into at least a first piece of second control information in accordance with a primary second control information format and to impart a pointer to a pointer region so that the first control information format and the primary second control information format have a common data length; and
a transmitting unit configured to transmit the first and second control information corresponding to the first control information and the primary second control information formats, respectively.

9. The transmitting apparatus according to claim 8, wherein the division unit is configured to divide the second control information into a plurality of first pieces of control information and to impart the pointer to the pointer region in accordance with the primary second control information format.

10. The transmitting apparatus according to claim 8, wherein the division unit is configured to divide the second control information into a second piece of control information and to impart the pointer to the pointer region in accordance with a secondary second control information format.

11. The transmitting apparatus according to claim 10, wherein the second control information is based on downlink data mapping information for a plurality of main bands and wherein the second piece of control information comprises the downlink data mapping information for the plurality of main bands that was not contained in the first piece of control information.

12. The transmitting apparatus according to claim 11, further comprising an imparting unit configured to impart an error check code to the first control information format, the primary second control information format, and the secondary second control information format.

13. The transmitting apparatus according to claim 12, wherein the transmitting unit is further configured to transmit the second control information corresponding to the secondary second control information format.

14. The transmitting apparatus according to claim 8, wherein the control information generation unit generates the first control information based on downlink data mapping information for a single main band according to the first control information format.

15. The transmitting apparatus according to claim 8, wherein the second control information is based on downlink data mapping information for a plurality of main bands.

16. The transmitting apparatus according to claim 8, wherein the control information generation unit is further configured to generate third control information based on upload data mapping information according to a third control information format.

17. The transmitting apparatus according to claim 8, wherein the control information generation unit is further configured to generate fourth control information based on power transmission information according to a fourth control information format.

18. A transmitting apparatus comprising:
a control information generation unit configured to generate first and second control information, respectively, having different data lengths;
a division unit configured to divide the second control information into at least a first piece of second control information having a pointer in a pointer region so that the first control information and the first piece of second control information have a common data length, the pointer indicating a wireless communication resource used to transmit a different piece of the second control information; and
a transmitting unit configured to transmit the first and second control information.

* * * * *